(12) United States Patent
La Greca et al.

(10) Patent No.: US 12,584,252 B2
(45) Date of Patent: Mar. 24, 2026

(54) APPARATUS FOR THE CONTINUOUS PRODUCTION OF A MATTRESS COMPRISING AGGLOMERATED MINERAL FIBRES

(71) Applicant: STM TECHNOLOGIES S.R.L., Milan (IT)

(72) Inventors: Marco La Greca, Calvenzano (IT); Roberto Massini, Calvenzano (IT)

(73) Assignee: STM TECHNOLOGIES S.R.L., Milan (IT)

( * ) Notice: Subject to any disclaimer, the term of this patent is extended or adjusted under 35 U.S.C. 154(b) by 468 days.

(21) Appl. No.: 18/247,475

(22) PCT Filed: Oct. 7, 2021

(86) PCT No.: PCT/EP2021/077668
§ 371 (c)(1),
(2) Date: Mar. 31, 2023

(87) PCT Pub. No.: WO2022/074106
PCT Pub. Date: Apr. 14, 2022

(65) Prior Publication Data
US 2023/0228015 A1 Jul. 20, 2023

(30) Foreign Application Priority Data

Oct. 9, 2020 (IT) ........................ 102020000023782

(51) Int. Cl.
*D04H 1/4226* (2012.01)
*B68G 7/02* (2006.01)
(Continued)

(52) U.S. Cl.
CPC ............. *D04H 1/4226* (2013.01); *B68G 7/02* (2013.01); *C03B 37/10* (2013.01); *D04H 1/4209* (2013.01); *D04H 1/58* (2013.01); *D04H 1/736* (2013.01)

(58) Field of Classification Search
CPC ...... D04H 1/4226; D04H 1/4209; D04H 1/58; D04H 1/736; B68G 7/02; C03B 37/10
See application file for complete search history.

(56) References Cited

U.S. PATENT DOCUMENTS

| | | | | |
|---|---|---|---|---|
| 4,927,528 A | * | 5/1990 | Doppstadt | B07B 9/00 209/291 |
| 5,246,653 A | * | 9/1993 | Horres | D04H 1/4226 65/505 |
| 2018/0127232 A1 | * | 5/2018 | Nellenbach | B65H 75/241 |

FOREIGN PATENT DOCUMENTS

| | | |
|---|---|---|
| DE | 102005001687 A1 | 7/2006 |
| EP | 0547587 A1 | 6/1993 |

(Continued)

OTHER PUBLICATIONS

International Search Report and Written Opinion for Corresponding International Application No. PCT/EP2021/077668 (9 Pages) (Jan. 25, 2022).

*Primary Examiner* — Galen H Hauth
*Assistant Examiner* — John Robitaille
(74) *Attorney, Agent, or Firm* — LUCAS & MERCANTI, LLP

(57) ABSTRACT

An apparatus (20) for the continuous production of a mattress (14) of agglomerated mineral fibres is described, comprising a mineral fibre receiving or forming chamber (2), an accumulator conveyer (3) arranged below the receiving or forming chamber (2) and comprising adjacent drums (4) provided with perforated or gas-permeable circumferential surfaces (5) for receiving and accumulating the fibres to (Continued)

form a mattress (14) comprising mineral fibres between the drums (4), a gas extraction device (6) in fluid communication with the perforated or gas-permeable circumferential surfaces (5) of the drums (4) and a lower space between the drums (4) for unloading the mattress (14) of mineral fibres formed between the drums (4), the apparatus (20) being characterized in that said drums (4) comprise each a first half-drum (4*a*) and a second half-drum (4*b*) telescopically connected with each other and which are movable along the axis of rotation (X) between a first stroke-end position in which the first half-drum (4*a*) and the second half-drum (4*b*) are juxtaposed or in contact with each other, and a second stroke-end position in which the first half-drum (4*a*) and the second half-drum (4*b*) are spaced apart from each other at a predetermined maximum distance along the direction of the axis (X) of rotation of the drums (4), a gas-permeable or perforated circumferential band (22) being furthermore provided, which overlaps at least one of said first half-drum (4*a*)

and said second half-drum (4*b*) at opposite end portions of said half-drums (4*a*,4*b*).

12 Claims, 5 Drawing Sheets

(51) Int. Cl.
| | | |
|---|---|---|
| *C03B 37/10* | (2006.01) | |
| *D04H 1/4209* | (2012.01) | |
| *D04H 1/58* | (2012.01) | |
| *D04H 1/736* | (2012.01) | |

(56) References Cited

FOREIGN PATENT DOCUMENTS

| EP | 3663626 A1 | 6/2020 |
|---|---|---|
| JP | H0340853 A | 2/1991 |

* cited by examiner

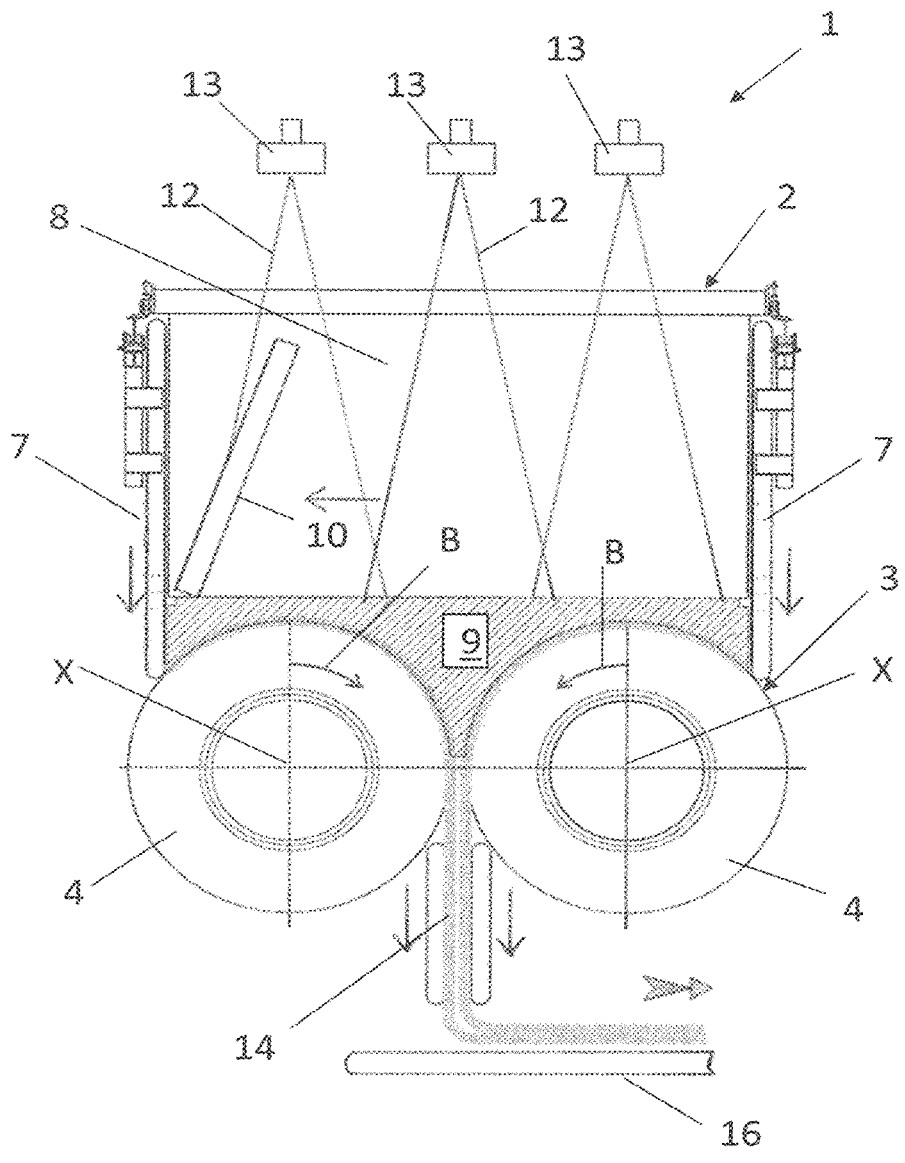
Fig. 1 - Prior Art

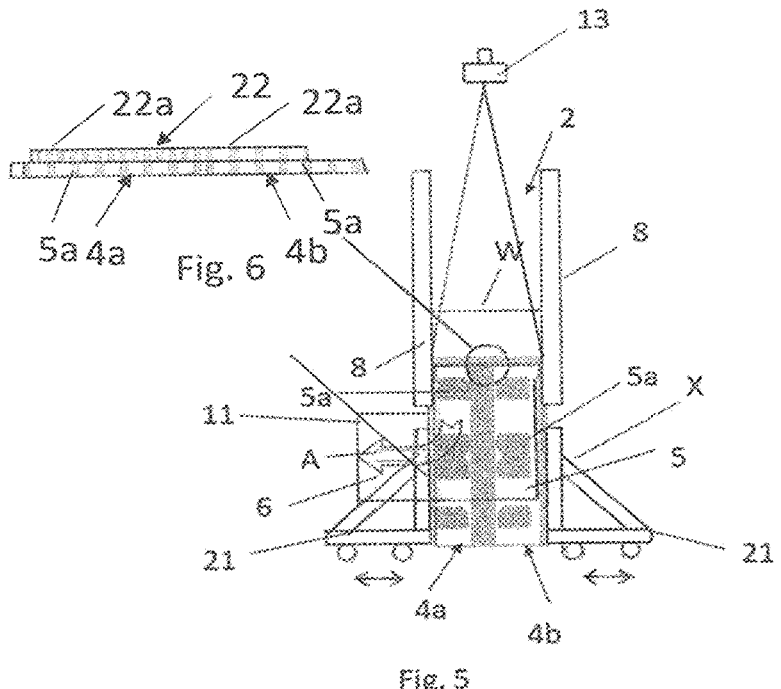
Fig. 6
Fig. 5
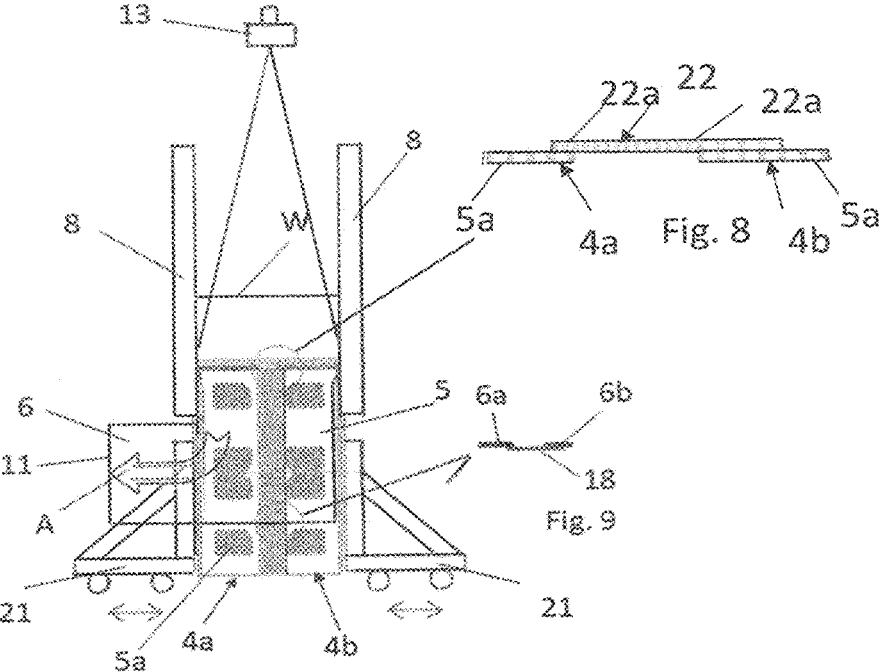
Fig. 8
Fig. 9
Fig. 7

APPARATUS FOR THE CONTINUOUS PRODUCTION OF A MATTRESS COMPRISING AGGLOMERATED MINERAL FIBRES

CROSS-REFERENCE TO RELATED APPLICATIONS

This application is a 371 of PCT/EP2021/077668, filed Oct. 7, 2021, which claims the benefit of Italian Patent Application No. 102020000023782, filed Oct. 9, 2020.

FIELD OF APPLICATION

In its more general aspect, the present invention relates to the production of thermally insulating mattresses comprising agglomerated mineral fibres (unwoven), such as for example glass fibres or rock wool fibres.

In particular, the present invention relates to an apparatus for the continuous production of a mattress of agglomerated mineral fibres comprising a mineral fibre receiving or forming chamber, an accumulator conveyer arranged below the receiving or forming chamber and comprising adjacent drums provided with perforated or gas-permeable surfaces for receiving and accumulating the fibres to form a mattress of agglomerated mineral fibres between the drums, a gas extraction device in fluid communication with the perforated or gas-permeable surfaces of the drums and a lower space between the drums for unloading the mattress formed between the drums.

The present invention represents in particular an improvement of the prior art for receiving (collecting) so-called insulating mineral fibres containing a binder at the liquid state and for separating the gases and induced air coming from the fiberization machines in order to produce a mattress with said mineral fibres.

PRIOR ART

As it is known in the art, the production of mattresses comprising agglomerated mineral fibres, such as glass fibres, involves the separation of the fibres produced by the fibre forming machines (fiberization machines) from the gases and induced air generated by the burners of these machines and the collection and forming (accumulation) of the separated fibres to form a felt, substantially in the form of a mattress, containing agglomerated mineral fibres.

In order to perform these operations, it is well known to use apparatuses comprising a receiving or collecting chamber intended to be fed above by a flow comprising mineral fibres, gases and induced air coming from the fiberization machines, an accumulator conveyer arranged below the fibre receiving or collecting chamber and comprising adjacent drums provided with perforated or gas-permeable surfaces for receiving and accumulating the fibres to form a mattress comprising agglomerated mineral fibres between the drums, a gas extraction device in communication with the perforated or gas-permeable surfaces of the drums and a lower space between the drums for unloading the mattress comprising agglomerated mineral fibres formed between the drums.

In particular, according to known methods, the flow comprising gases, induced air and mineral fibres impregnated with a binder mixture (resin) outputted from the fiberization machines is introduced in the fibre receiving or collecting chamber and directed towards the gas-permeable or perforated surfaces of the drums arranged below the receiving or collecting chamber. These surfaces are gas-permeable or they have holes having such dimensions as to allow gases to pass therethrough but not mineral fibres to pass. They are subject to the suction effect exerted by the gas extraction device and operate as a kind of filter allowing fibres to be accumulated thereon to form a mattress comprising mineral fibres while the sucked gas passing therethrough is released outside. The so-formed mattress comprising mineral fibres is thus unloaded through the lower space formed between the drums which is suitably predetermined depending on the desired thickness for the mattress.

Conventionally, the fibre receiving or forming chamber comprises an upper part having first vertical walls longitudinally extended in the direction of the axis of rotation of the drums and second vertical walls transversally extended with respect to the axis of rotation of the drums, such first and second walls laterally delimiting the receiving or forming chamber, and a lower element equipped with recesses in the form of arcs of a circle below which the drums are housed.

The first vertical walls and the second vertical walls of the chamber usually consist of rotating carpets or belts, usually of polyvinylchloride (PVC), whose outward-facing part is in contact with cleaning means, for example scraping blades, which arrange to keep the surfaces of these walls clean from clots of fibres impregnated with the binder mixture which otherwise would form thereon if the walls were fixed and which could fall between the drums damaging the quality of the produced mattress of mineral fibres.

Furthermore, the first vertical walls have a greater height since they laterally overlap the lower element ending below in tangential juxtaposition to the gas-permeable or perforated surface of the drums while the second vertical walls of the chute end below above the lower element and are movable above the drums along the direction of the axis of rotation thereof moving away or approaching each other so as to adjust the width of the fibre receiving or forming chamber (i.e. the chamber dimension in the direction of the axis of rotation of the drums) depending on the width or transversal width of the mattress of mineral fibres which is to be obtained.

The lower element of the chamber is fixed and it has a width or amplitude in the direction of the axis of rotation of the drums substantially corresponding to the width of the receiving or forming chamber obtained by adjusting the mutual distance between the second vertical walls.

Although the above-described apparatus is substantially satisfactory from the functional point of view, it is not devoid of drawbacks among which the relevant one concerning the formation of clots of fibres impregnated with the resin on the fixed lower element during operation.

These clots tend then to fall between the drums and can thus jeopardise the features and the quality of the obtained mattress of mineral fibres especially where the apparatus operation time is particularly long.

In that case, a shutdown of the apparatus may be necessary to perform cleaning operations with the subsequent prolongation of production times and decrease in production yield.

In order to remedy this drawback it has been suggested to extend the second vertical walls downwards to a level being substantially equal to that of the first vertical walls so as to arrange, when using the apparatus, the second vertical walls with the lower part thereof in lateral juxtaposition to the drums rather than above the lower element. This makes it possible to remove the fixed lower element.

However, even if this solution can reduce the formation of clots of impregnated fibres inside the receiving or forming chamber, it introduces strong limitations among which the fact that it is no longer possible to adjust the width of the above chamber through the mutual moving away or approaching movement of the second vertical walls along the direction of the axis of rotation of the drums and accordingly it is impossible to change the width or amplitude of the mattress of mineral fibres obtained by the apparatus according to production requirements.

The main object of the present invention is therefore to provide an apparatus for the continuous production of a mattress comprising agglomerated mineral fibres having such structural features as to allow the width of the produced mattress to be adjusted according to requirements meanwhile avoiding or minimizing the formation of clots of impregnated fibres inside the fibre receiving or forming chamber during the apparatus operation, so as to overcome the drawbacks mentioned above with reference to the prior art.

Another object of the present invention is to provide an apparatus as above which has not structural complications so as to make the products obtained therefrom simple and economical to manufacture.

SUMMARY OF THE INVENTION

These objects are achieved by an apparatus for the continuous production of a mattress of agglomerated mineral fibres comprising a mineral fibre receiving or forming chamber, an accumulator conveyer arranged below the receiving or forming chamber and comprising adjacent drums provided with perforated or gas-permeable circumferential surfaces for receiving and accumulating the fibres to form a mattress comprising mineral fibres between the drums, a gas extraction device in fluid communication with the perforated or gas-permeable surfaces of the drums and a lower space between the drums for unloading the mattress comprising mineral fibres formed between the drums, the apparatus being characterized in that said drums comprise each a first half-drum and a second half-drum telescopically connected with each other and which are movable along an axis of rotation between a first stroke-end position in which the first half-drum and the second half-drum are juxtaposed or in contact with each other and a second stroke-end position in which the first half-drum and the second half-drum are spaced apart from each other at a predetermined maximum distance, a gas-permeable or perforated circumferential band being furthermore provided, which overlaps at least one of said first half-drum and said second half-drum at opposite end portions of said half-drums.

In an embodiment, the gas-permeable or perforated circumferential band consists of a circumferentially extending gas-permeable or perforated plate fixed on an end portion of the circumferential surface of one of the first half-drum and the second half-drum and partially overlapped to an opposite end portion of the circumferential surface of the other of the first half-drum and the second half-drum.

In another embodiment, the gas-permeable or perforated circumferential band consists of a gas-permeable or perforated ring integrally formed at one end of one of the first half-drum and the second half-drum and having a greater diameter than the latter, said gas-permeable ring being furthermore partially overlapped to an opposite end portion of the circumferential surface of the other of the first half-drum and the second half-drum.

In an embodiment, the fibre receiving or forming chamber comprises first vertical walls longitudinally extended in the direction of the axis of rotation of the drums and ending each below in tangential juxtaposition to the gas-permeable or perforated circumferential surfaces of a first half-drum and a second half-drum, and second vertical walls transversally extended with respect to the axis of rotation of the drums and ending each below in lateral juxtaposition to a first half-drum or a second half-drum.

In an embodiment, the first vertical walls and the second vertical walls of the fibre receiving or forming chamber substantially have the same height.

In an embodiment, the second vertical walls are movable along the direction of the longitudinal axis of the drums between the first vertical walls moving away or approaching each other so as to adjust the width of the receiving or forming chamber by an amount which is substantially equal to the sum of the width of the circumferential surface of the drums and of the distance determined by the mutual positioning of the first half-drums and the second half-drums along the direction of the axis of rotation of said drums.

In an embodiment, the gas-permeable or perforated circumferential band has a reduced thickness comprised between 1 mm and 5 mm, preferably of about 3 mm.

In an embodiment, the circumferential surface of the drums is perforated and the overlapping circumferential band is perforated with a ratio between the solid part and the empty part which is greater than that between the solid part and the empty part of the half-drums $4a$ and $4b$ in the overlapping area of at least one of said first half-drum and said second half-drum and with holes having dimensions which are smaller than the dimensions of the holes of the half-drums. In other words, in the area overlapping or surmounting the circumferential surface of at least one of the half-drums, the circumferential band has a number of holes which is greater than the number of underlying holes which are present in at least one of the half-drums.

Advantageously, this allows the loss of active surface for sucking gases on the drums during the apparatus operation to be reduced to a minimum because of the possible overlapping of solid parts of the overlapping band on the underlying holes of the drums, especially in case of loss or imperfect synchrony of the rotational movement of these drums.

In an embodiment, the above first vertical walls which are longitudinally extended in the direction of the axis of rotation of the drums have a direction of rotation which is substantially parallel to the axis of rotation of the drums, that is along the width of the fibre receiving or forming chamber while the above second vertical walls which are transversally extended with respect to the axis of rotation of the drums have a vertical direction of rotation (from bottom to top or vice versa), which is substantially perpendicular to the axis of rotation of the drums or, in other words, in the direction of the height of the fibre receiving or forming chamber.

Advantageously, this solution allows possible damages to the edges of the mattress of fibres formed between the drums 4 to be avoided. Furthermore, the above solution allows the fibre loss in the receiving chamber to be reduced with a subsequent better yield of the whole production line.

In an embodiment, the gas extraction device comprises a suction chamber arranged inside in each drum below the gas-permeable or perforated surfaces thereof, each suction chamber comprising a first half-chamber arranged inside in a first half-drum and a second half-chamber arranged inside in a second half-drum, the first half-chamber and the second half-chamber being movable along the axis of rotation between the first stroke-end position and the second stroke-end position of said first half-drum and said second half-drum, a band being furthermore provided, which overlaps at least one of said first half-chamber and said second half-chamber at opposite end portions of said half-chambers.

The features and advantages of the present invention will be more apparent from the following description given by way of indicative and non-limiting example with reference to the attached Figures.

BRIEF DESCRIPTION OF THE FIGURES

In the Figures:

FIG. 1 shows a side view of an apparatus for the continuous production of a mattress comprising agglomerated mineral fibres according to the prior art;

FIG. 2 shows a side view of the apparatus of FIG. 1 from a different angle in an operating configuration with fibre receiving or forming chamber having a smaller width;

FIG. 3 shows a side view of the apparatus of FIG. 1 from a different angle in an operating configuration with fibre receiving or forming chamber having a greater width;

FIG. 5 shows a side view of the apparatus of FIG. 4 from a different angle in an operating configuration with fibre receiving or forming chamber having a smaller width;

FIG. 6 shows an enlarged view of a detail of the apparatus illustrated in FIG. 5;

FIG. 7 shows a side view of the apparatus of FIG. 4 from a different angle in an operating configuration with fibre receiving or forming chamber having a greater width;

FIG. 8 shows an enlarged view of a detail of the apparatus illustrated in FIG. 7;

FIG. 9 shows an enlarged view of another detail of the apparatus illustrated in FIG. 7;

DETAILED DESCRIPTION

Figures 2, 3:
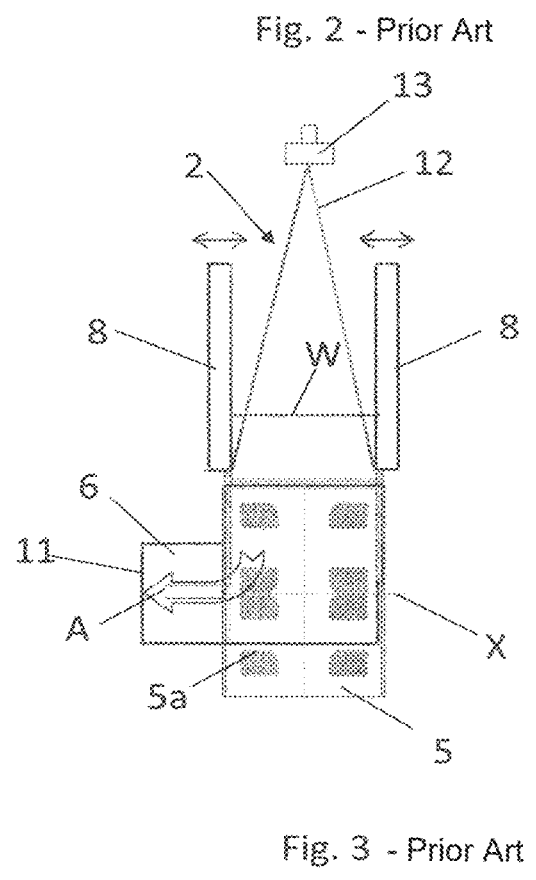
Figure 4:
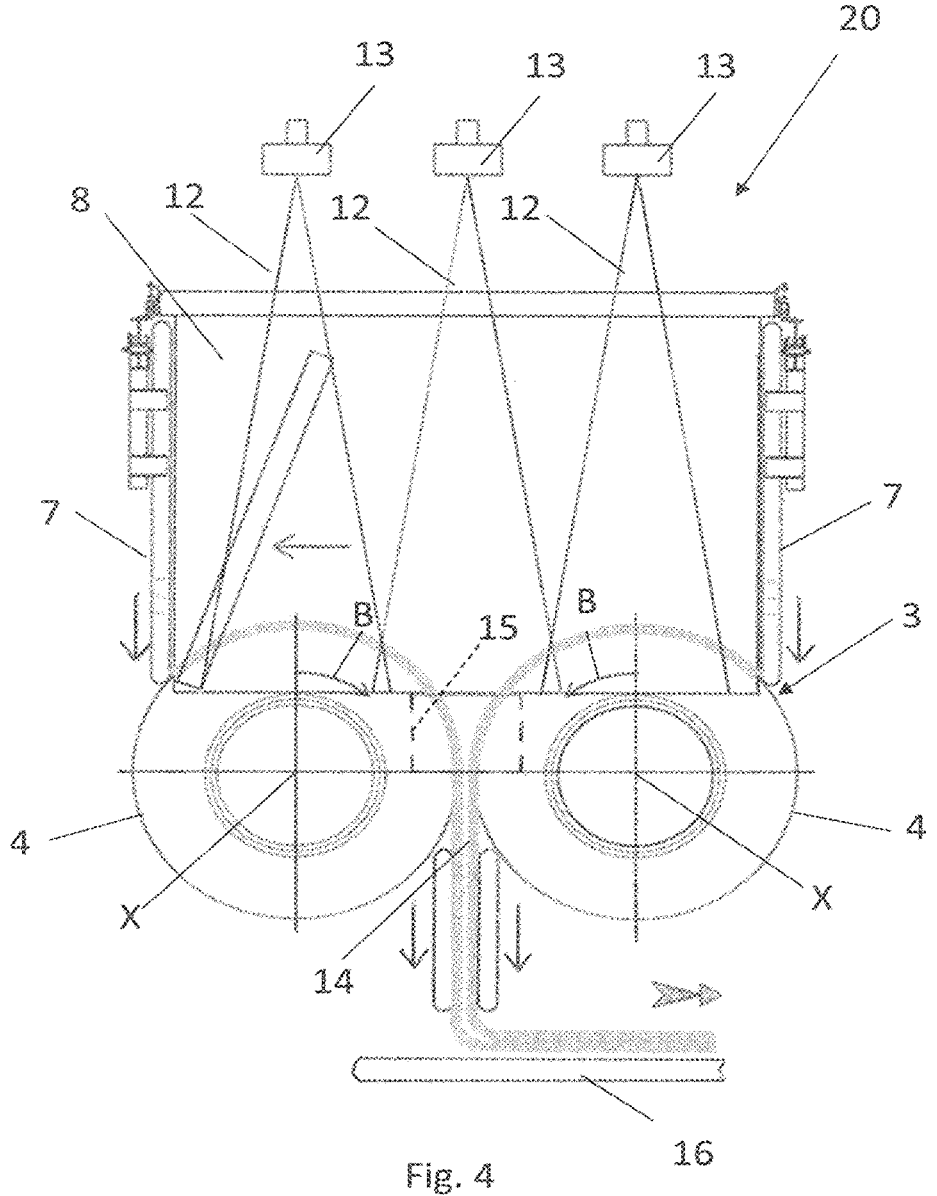
FIG. 4 shows a side view of an apparatus for the continuous production of a mattress comprising agglomerated mineral fibres according to an embodiment of the invention.

With reference to FIGS. 1-3, an apparatus according to the prior art for the continuous production of a mattress comprising agglomerated mineral fibres is globally indicated with the reference number 1.

The apparatus 1 comprises a fibre receiving or forming chamber 2, an accumulator conveyer 3 arranged below the receiving or forming chamber 2 and comprising adjacent drums 4 provided with circumferential perforated surfaces 5, a gas extraction device 6 (not illustrated in detail) arranged inside the drums 4 and in communication with the perforated surfaces 5 of the drums.

The receiving or forming chamber 2 comprises above first vertical walls 7 longitudinally extended in the direction of the axis of rotation X of the drums 4 and second vertical walls 8 transversally extended with respect to the axis of rotation X of the drums 4, such first and second walls 7,8 delimiting above and laterally the receiving or forming chamber 2. Below, the receiving or forming chamber 2 is closed by a lower element 9 equipped with recesses in the form of arcs of a circle below which the drums 4 are housed.

The first vertical walls 7 and the second vertical walls 8 of the chamber 2 consist of endlessly-movable rotating carpets or belts (for example of PVC), whose outward-facing part is in contact with at least one scraping blade 10 which arranges to keep the surfaces of these walls clean from clots of fibres impregnated with the binder mixture which can form thereon.

The first vertical walls 7 are laterally juxtaposed to the lower element 9 and end below in tangential juxtaposition to the perforated circumferential surface 5 of a respective drum 4. The second vertical walls 8 end instead above the lower element 9 having therefore a smaller height than that of the first vertical walls 7 and are movable between the first walls 7 and above the drums 7 along the direction of the axis of rotation X thereof moving away or approaching each other so as to adjust the width W of the receiving or forming chamber 2 (i.e. the dimension of the chamber 2 in the direction of the axis of rotation X of the drums 4) depending on the width or transversal width of the mattress comprising mineral fibres which is to be obtained. An exemplary configuration of the apparatus 1 is shown in FIG. 2 in which the second vertical walls 8 are closer so as to have a smaller width W of the receiving or forming chamber 2 while another exemplary configuration of the apparatus 1 is shown in FIG. 3 in which the second vertical walls 8 are more spaced apart from each other so as to have a greater width W of the receiving or forming chamber.

The lower element 9 of the chamber 2 is fixed and it has a width or amplitude in the direction of the axis X of rotation of the drums 4 substantially corresponding to the width W of the chamber 2 obtained by adjusting the mutual distance between the second vertical walls 8.

The juxtaposition of the second vertical walls 8 in contact above the lower element 9 together with the overlapping of the first vertical walls 7 above the sides of the lower element 9 and in tangential contact on the perforated circumferential surface 5 of the drums 4 substantially allows the receiving or forming chamber 2 to be "sealed".

As far as the operation of the apparatus 1 is concerned, the set of fibres 12 impregnated with the binder mixture, gases and induced air outputted from respective fiberization units 13 are introduced in the receiving or forming chamber 2 and directed towards the perforated circumferential surfaces 5 of the drums 4, which are rotated in opposed directions as highlighted by arrows B. The fibres accumulate on the circumferential surfaces 5 of the drums 4 forming a mattress 14 comprising agglomerated mineral fibres while gases pass through the holes 5a on the circumferential surfaces 5 of the drums 4, suitably sucked by the extraction device 6, for example a suction device which is able to create a vacuum, to be released outside (arrow A).

In fact, it should be noted that the dimensions of the holes 5a of the circumferential surfaces 5 are reduced enough to allow gases to pass but not fibres to pass.

The mattress 14, carried by the rotational movement of the drums 4 in opposed directions, is thus conveyed towards a lower space between the drums 4 where it is unloaded and collected on a conveyor belt 16 to be sent to next treatment stations, storage or other uses.

As previously said, although the apparatus 1 allows the width of the mattress 14 comprising mineral fibres to be changed depending on the predetermined width W in the fibre receiving or forming chamber 2, the presence of the fixed lower element 9 promotes the formation of clots of impregnated fibres thereon during the apparatus operation.

These clots, in the long run, tend to fall between the drums 4 jeopardizing the quality of the mattress 14.

With reference now to FIGS. 4-9, an apparatus according to the invention for the continuous production of a mattress comprising agglomerated mineral fibres is now described. This apparatus is globally indicated with the reference number 20.

The elements of the apparatus 20 which are structurally and/or functionally equivalent to corresponding elements of the above-described apparatus 1 will be given the same reference numbers as the latter.

The apparatus 20 comprises a fibre receiving or forming chamber 2, an accumulator conveyer 3 arranged below the fibre receiving or forming chamber 2 and comprising adjacent drums 4 provided with circumferential surfaces 5 equipped with holes 5*a*, and a gas extraction device 6 having an output opening 11, arranged inside the drums 4 and in fluid communication with the perforated surfaces 5 of the drums 4.

The receiving or forming chamber 2 comprises above first vertical walls 7 longitudinally extended in the direction of the axis of rotation X of the drums 4 and second vertical walls 8 transversally extended with respect to the axis of rotation X of the drums 4, such first and second walls 7,8 delimiting above and laterally the receiving or forming chamber 2.

The first vertical walls 7 and the second vertical walls 8 of the receiving or collecting chamber 2 consist of endlessly-movable rotating carpets or belts, whose outward-facing part is in contact with at least one scraping blade 10 which arranges to keep the surfaces of these walls clean from possible clots of fibres impregnated with the binder mixture which can form thereof.

In accordance with a first aspect of the present invention, the first vertical walls 7 end below in tangential juxtaposition to the perforated circumferential surface 5 of a respective drum 4 while the second vertical walls 8 are laterally juxtaposed to the drums 4 at an upper area thereof above the output opening 11 of the extraction device 6 so as to laterally close a portion of the perforated circumferential surface 5 lying, during the rotation of the drums 4, above the lower space which is present between the drums 4 for unloading the mattress 14.

In an alternative embodiment of the present invention, the apparatus 20 can further comprise third vertical walls 15 (shown with dotted lines in FIG. 4) arranged below the second vertical walls 8 and having such smaller dimensions as to be laterally juxtaposed to the drums 4 and to laterally close a portion of the circumferential perforated surface 5 of the drums 4 lying, during the rotation thereof, from the smaller end of the second vertical walls 8 substantially up to the height of the lower space for unloading the mattress 14 substantially located at the minimum distance between the drums 4 in the transversal direction to the axis of rotation X of the drums 4.

These third walls 15 are of the same type as the second vertical walls 8 and the outward-facing part thereof can be brought into contact with a scraping blade (not shown) to remove possible clots of fibres impregnated with the binder mixture which can form thereon.

In the present embodiment, the second vertical walls 8 substantially have the same height as the first vertical walls 7. Furthermore, the second vertical walls 8 are movable outside the drums 4 along the direction of the axis of rotation X thereof moving away or approaching each other so as to adjust the width W of the chamber 11 of the receiving or forming chamber 2 (i.e. the dimension of the chamber 2 in the direction of the axis of rotation X of the drums).

In accordance with the present invention, each drum 4 consists of a first half-drum 4*a* and a second half-drum 4*b* telescopically connected with each other and which are movable along the axis of rotation X between a first stroke-end position in which the first half-drum 4*a* and the second half-drum 4*b* are juxtaposed or in contact with each other (FIGS. 5-6) and a second stroke-end position in which the first half-drum 4*a* and the second half-drum 4*b* are spaced apart from each other at a maximum distance along the direction of the axis X of rotation of the drums which is suitably predetermined depending on the desired maximum width W for the receiving or forming chamber 2 and accordingly for the final product (FIGS. 7 and 8).

In other words, the mutual movement of the first half-drums 4*a* and the second half-drums 4*b* along the direction of the axis X of rotation of the drums 4 together with the movement of the second vertical walls 8 along the same direction so as to be laterally juxtaposed to the drums 4 allows the width W of the receiving or forming chamber 2 to be adjusted to a value which is substantially equal to the sum of the width of the circumferential surface of the drums 4 and of the distance determined by the mutual positioning of the first half-drums 4*a* and the second half-drums 4*b* along the direction of the axis of rotation of said drums.

The telescopic connection can be performed in a conventional manner per se, for example the first half-drum 4*a* and the second half-drum 4*b* can be provided with coaxial tubular stems extended along the axis of rotation X of the drums 4 and sliding into each other.

The telescopic movement of the first half-drum 4*a* and the second half-drum 4*b* of each drum 4 can be performed by at least one respective carriage 21 connected to the first half-drum 4*a* or the second half-drum 4*b* at a lower area thereof and which is movable back and forth in the direction of the axis of rotation X of the drums 4.

Furthermore, in accordance with another aspect of the present invention, the apparatus 20 comprises for each drum 4, a circumferentially extending perforated plate 22 fixed on an end portion of the circumferential surface 5 of the second half-drum 4*b* and partially overlapped to an opposite end portion of the circumferential surface 5 of the first half-drum 4*a*.

Advantageously, the plate 22 allows the space which is created between the first half-drum 4*a* and the second half-drum 4*b* to be closed in any spacing position therebetween. In fact, the plate 22 has a width which is greater than the predetermined maximum distance between the first half-drum 4*a* and the second half-drum 4*b* along the direction of the axis X of rotation of the drums 4 in the maximum-moving-away stroke-end position of the half-drums 4*a*,4*b* so as to appear always partially overlapped with a free end circumferential portion thereof to one of the half-drums 4*a*, 4*b*.

At the same time, the plate 22 being perforated with holes 22*a* having such dimensions as to hold the fibres and let gases pass (such as the holes 5*a* on the circumferential surface of the drums 4) allows the active surface of the drums 4 to be extended for accumulating the fibres where the first half-drum 4*a* and the second half-drum 4*b* are in a spaced-apart position from each other so as to suitably adjust the width W of the receiving and forming chamber 2 and accordingly the width of the final product unloaded from the apparatus 20.

In alternative embodiments of the apparatus 20 (not shown), the above-described plate 22 can be replaced by functionally equivalent means, for example by a perforated ring integrally formed at one end of one of the first half-drum 4*a* and the second half-drum 4*b* and having a greater diameter than the latter, the perforated ring being furthermore partially overlapped to an opposite end portion of the circumferential surface 5 of the other of the first half-drum 4*a* and the second half-drum 4*b*.

Likewise, in the apparatus 20, the gas extraction device comprises a suction chamber 6 arranged inside in each drum 4 below the circumferential perforated surfaces 5 and each suction chamber comprises a first half-chamber arranged inside in a first half-drum 4*a* and a second half-chamber arranged inside in a second half-drum 4*b*. The first half-chamber and the second half-chamber are movable along the axis of rotation X between the first stroke-end position and the second stroke-end position of the first half-drum 4*a* and the second half-drum 4*b*, and a band 18 is furthermore provided, which overlaps the first half-chamber and the second half-chamber at opposite end portions thereof so as to close the space which is created between the first half-chamber and the second half-chamber in any spacing position therebetween and thereby allowing gases to be sucked in each above position.

In the present embodiment, the band 18 consists of a plate fixed on an external peripheral end portion of a wall 6*b* of the second half-chamber and partially overlapped to an opposite external peripheral end portion of a wall 6*a* of the first half-chamber. It is however possible to use other functionally equivalent means.

A configuration of the apparatus 20 in which the first half-drums 4*a* and the second half-drums 4*b* of the drums 4 are side by side (juxtaposed) with the second vertical walls 8 laterally juxtaposed to the half-drums 4*a* or to the second half-drums 4*b* of the drums 4 so as to define a minimum width W for the receiving or forming chamber 2 is shown in FIGS. 5 and 6. In this configuration, the portion of the circumferential plate 22 projecting from the second half-drum 4*b* towards the first half-drum 4*a* of each drum 4 is entirely overlapped to a portion of the circumferential surface 5 of the first half-drum 4*a* and the width W of the fibre receiving or collecting chamber 2 is substantially equal to the sum of the widths (or amplitudes) of the first half-drum 4*a* and the second half-drum 4*b* of each drum 4 in the direction of the axis X of rotation of the drums 4. In this configuration, the two suction half-chambers of the suction device 6 of each drum 4 are also juxtaposed to each other being integral with the respective half-drums 4*a* and 4*b* and movable therewith.

A configuration of the apparatus 20 in which the first half-drums 4*a* and the second half-drums 4*b* of the drums 4 are spaced apart from each other with the second vertical walls 8 laterally juxtaposed to the half-drums 4*a* or the second half-drums 4*b* of the drums 4 so as to define a maximum width W for the fibre receiving or forming chamber 2 is instead shown in FIGS. 7-9. In this configuration, the portion of the circumferential plate 22 projecting from the second half-drum 4*b* towards the first half-drum 4*a* of each drum 4 is overlapped for a minimum free end circumferential part to the circumferential surface 5 of the first half-drum 4*a* so as to close the underlying space being created as a result of the first half-drums 4*a* and the second half-drums 4*b* of the drums 4 mutually moving away. A width W is thereby defined for the fibre receiving or forming chamber 2 which is substantially equal to the sum of the widths (or amplitudes) of the first half-drum 4*a* and the second half-drum 4*b* of each drum 4 and of the predetermined maximum distance between the first half-drums 4*a* and the second half-drums 4*b* in the direction of the axis X of rotation of the drums. In this configuration, the two suction half-chambers of the suction device 6 of each drum 4 are also likewise spaced apart from each other being integral with the respective half-drums 4*a* and 4*b* and movable therewith and the band 18 is overlapped to free end peripheral portions of the wall 6*a* of the first half-chamber and of the wall 6*b* of the second half-chamber so as to close the space being created therebetween as a result of the first half-drums 4*a* and the second half-drums 4*b* mutually moving away.

Obviously, the above-described features for the apparatus 20 also allow the width W for the receiving and forming chamber 2 to be adjusted to intermediate values between the minimum width and the maximum width by suitably adjusting the mutual position (distance) of the first half-drums 4*a* and the second half-drums 4*b* in intermediate positions between the juxtaposition end of stroke of the first half-drums 4*a* and the second half-drums 4*b* and the maximum moving-away (spacing) end of stroke between the first half-drums 4*a* and the second half-drums 4*b*.

It should be noted that the plate 22 or other functionally equivalent means can be advantageously made with a reduced thickness so as to reduce the height of the step created by the presence of the plate 22 on the circumferential surface 5 of the drums 4 and keep possible inhomogeneities in the thickness of the final product within acceptable values or anyhow such as not to jeopardize the desired features for the final product.

In this respect, the plate 22 can be made with a thin thickness preferably comprised between 1 mm and 5 mm, in particular of about 3 mm.

Furthermore, advantageously, the perforated plate 22 has a ratio between the solid part and the empty part (holes 22*a*) which is greater than that between the solid part and the empty part (holes 5*a*) of the half-drums 4*a* and 4*b* in the area overlapping the circumferential surface of the first half-drum 4*a* with holes 22*a* having dimensions which are smaller than the dimensions of the holes 5*a* of the half-drums 4*a* and 4*b*. In other terms, in the area overlapping the circumferential surface of the first half-drum 4*a*, the plate 22 has a greater number of holes 22*a* with respect to the underlying holes 5*a* which are present in the half-drum 4*a*.

Advantageously, this allows the loss of active surface for sucking gases on the drums 4 during the operation of the apparatus 20 to be reduced to a minimum because of the possible overlapping of solid parts of the overlapping plate 22 on the underlying holes 5*a* of the drums 4, specially in case of loss or imperfect synchrony of the rotational movement of these drums 4.

Figures 10, 11, 12:
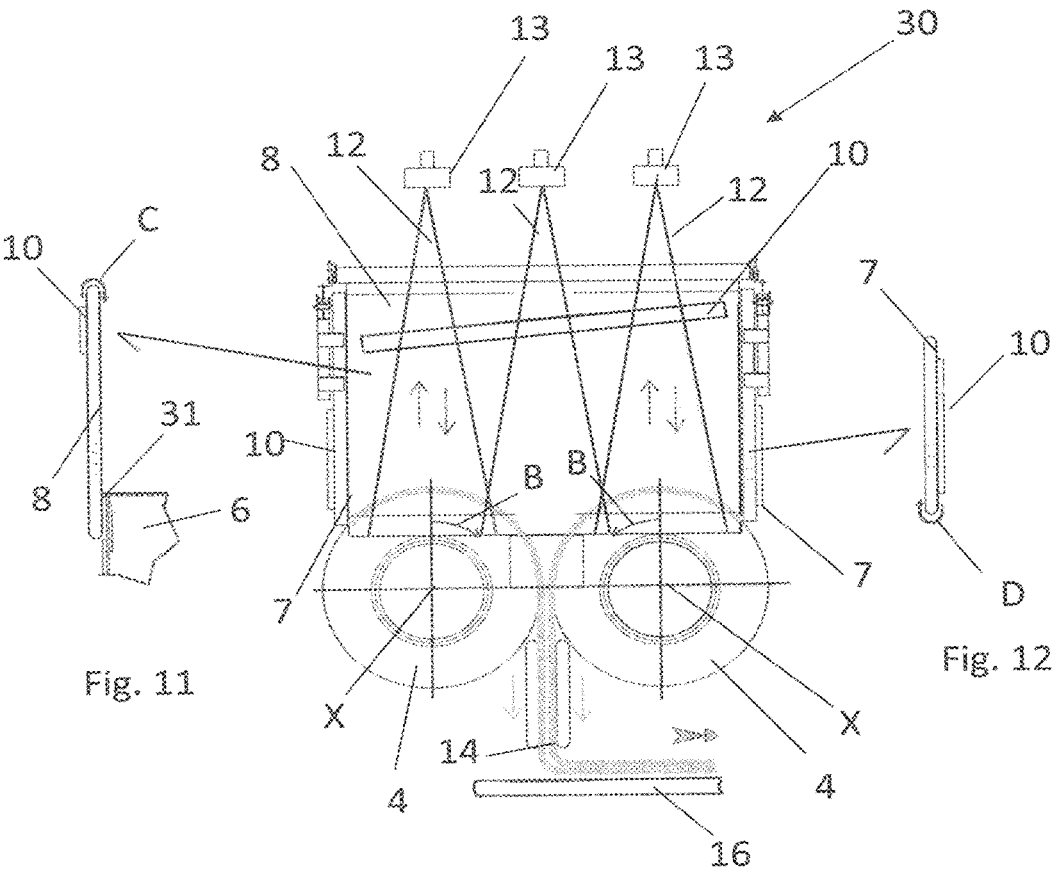
FIG. 10 shows a side view of an apparatus for the continuous production of a mattress comprising agglomerated mineral fibres according to another embodiment of the invention.
FIG. 11 shows a side view of a second vertical wall of the apparatus of FIG. 10.
FIG. 12 shows a top view of a first vertical wall of the apparatus of FIG. 10.

An apparatus according to another embodiment of the present invention, globally indicated with the reference number 30, is described in FIGS. 10-12.

The elements of the apparatus 30 which are structurally and/or functionally equivalent to corresponding elements of the apparatus 20 described above with reference to FIGS. 4-9 will be given the same reference numbers of the latter elements and will not be further described for the sake of conciseness.

The apparatus 30 substantially has the same structural and functional features previously described with reference to the apparatus 20 but it has some peculiarities concerning the directions of rotation of the vertical walls 7 and of the second vertical walls 8 laterally delimiting the fibre receiving and collecting chamber 2 consisting of endlessly-movable rotating carpets or belts (for example of PVC), whose outward-facing part is a contact with a scraping blade 10.

In fact, the first vertical walls 7 which are longitudinally extended in the direction of the axis X of rotation of the drums 4 have a direction of rotation which is substantially parallel to the axis X of rotation of the drums 4, that is along the width W of the fibre receiving chamber 2, as represented by the arrow D in FIG. 12. Differently, the second vertical walls 8 which are transversally extended with respect to the axis X of rotation of the drums 4 have a vertical direction of rotation (from bottom to top or vice versa), which is substantially perpendicular to the axis X of rotation of the drums 4 or, in other words, in the direction of the height of the fibre receiving and collecting chamber 2 as represented by the arrow C in FIG. 11.

Advantageously, this solution allows possible damages of the edges of the fibre mattress 16 formed between the drums 4 to be avoided. Vice versa, if the direction of the second vertical walls 8 were in the horizontal direction (i.e. in the direction of the length of the chamber 2), thereby moving in the same direction with respect to one of the adjacent drums 4 and in the opposed direction with respect to the other of the adjacent drums 4, the undesired formation of rolled fibre clots can occur, which can damage the finished product.

Furthermore, the above solution allows the fibre loss in the receiving chamber 2 to be reduced with a subsequent better yield of the whole production line.

In the apparatus 30 a sealing element 31 (for example a board of PVC) is furthermore provided between the drums 4 and the second vertical walls 8 to improve the sealing of the fibre receiving or forming chamber 2. Such a sealing element can be similarly provided in the above-described apparatus 20.

With regard to the operation of the above-described apparatus 20 and apparatus 30, the fibres 12 impregnated with the binder mixture, gas and induced air outputted from respective fiberization units 13 are introduced in the receiving or forming chamber 2 and directed towards the perforated circumferential surfaces 5 of the drums 4, which are rotated in opposed directions as highlighted by arrows B. The fibres accumulate on the circumferential surfaces 5 of the drums 4 forming a mattress 14 comprising agglomerated fibres while gases pass through the holes 5a of the circumferential surfaces 5, suitably sucked by the extraction device 6, for example a device which is able to create a vacuum, to be released outside (arrow F) from the output opening 11. In fact it should be noted that the dimensions of the holes 5a of the circumferential surfaces 5 are reduced enough to allow gases to pass but not fibres to pass.

The mattress 14, carried by the rotational movement of the drums 4, is thus conveyed towards the lower space between the drums 4 where it is unloaded and collected on a conveyor belt 16 to be sent to next treatment stations, storage or other uses.

In view of the above, the apparatus according to the present invention achieves the predetermined objects and obtains important advantages with respect to known apparatuses.

In fact, due to the adoption of movable drums consisting of two half-drums sliding along the axis of rotation thereof (rather than fixed drums like in the prior art) and to the adoption of an overlapping band between the half-drums, the apparatus according to the invention allows to effectively adjust the width of the receiving or forming chamber of the fibres coming from the fiberization machines according to requirements and accordingly the width of the product unloaded from the apparatus within wide ranges according to the most varied production requirements. This can be performed in a simple way by suitably adjusting the mutual position (distance) between the half-drums composing the drums and arranging to laterally juxtapose to the drums the vertical walls of the chute longitudinally extending in the transversal direction to the axis of rotation of the drums.

At the same time, due to the above features, the apparatus according to the invention does no longer need a lower element for closing the receiving chamber and accordingly it is not subject to the formation of clots of impregnated fibres inside the fibre receiving or collecting chamber which could jeopardize the quality of the final product as it occurs in known apparatuses.

Furthermore, the apparatus according to the invention advantageously allows the vertical walls to be lowered in lateral juxtaposition to the drums up to laterally close a considerable portion of the perforated circumferential surface lying, during the rotation of the drums, above the lower space which is present between the drums for unloading the mattress, thereby allowing the production process to be improved.

It should be finally noted that the creation of movable drums telescopically sliding along the axis of rotation thereof and of an overlapping plate does not involve significant complications of structural, functional and/or construction nature of the apparatus.

A person skilled in the art will be allowed to bring several modifications and alternatives to the apparatus according to the invention, all however falling within the scope of protection of the attached claims.

The invention claimed is:

1. An apparatus for the continuous production of a mattress, comprising agglomerated mineral fibres, the apparatus comprising a mineral fibre receiving or forming chamber;

an accumulator conveyer arranged below the receiving or forming chamber and comprising adjacent drums provided with perforated or gas-permeable circumferential surfaces for receiving and accumulating the fibres in order to form a mattress comprising mineral fibres between the drums;

a gas extraction device in fluid communication with the perforated or gas-permeable circumferential surfaces of the drums; and a lower space between the drums for unloading the mattress comprising mineral fibres formed between the drums;

wherein the drums each comprise a first half-drum and a second half-drum telescopically connected with each other, wherein the first half-drum and the second half-drum are movable along the axis of rotation between a first stroke-end position in which the first half-drum and the second half-drum are juxtaposed or in contact with each other, and a second stroke-end position in which the first half-drum and the second half-drum are spaced apart from each other at a predetermined maximum distance along the direction of the axis of rotation of the drums, and a gas-permeable or perforated circumferential band being provided, which overlaps at least one of the first half-drum and the second half-drum at opposite end portions of the half-drums.

2. The apparatus according to claim 1, wherein the fibre receiving or forming chamber comprises first vertical walls longitudinally extended in the direction of the axis of rotation of the drums and ending each below in tangential juxtaposition to the gas-permeable or perforated circumferential surfaces of a first half-drum and a second half-drum, and second vertical walls transversally extended with respect to the axis of rotation of the drums and ending each below in lateral juxtaposition to the first half-drum or the second half-drum.

3. The apparatus according to claim 2, wherein the first vertical walls and the second vertical walls of the receiving or forming chamber have the same height.

4. The apparatus according to claim 2, wherein the second vertical walls are movable along the direction of the axis of rotation of the drums between the first vertical walls moving away or approaching each other so as to adjust the width of the receiving or forming chamber by an amount equal to the sum of the width of the circumferential surface of the drums and of the distance determined by the mutual positioning of the first half-drums and the second half-drums along the direction of the axis of rotation.

5. The apparatus according to claim 1, wherein the gas-permeable or perforated circumferential band has a thickness of between 1 mm and 5 mm.

6. The apparatus according to claim 5, wherein the gas-permeable or perforated circumferential band has a thickness of about 3 mm.

7. The apparatus according to claim 1, wherein the circumferential band is perforated with a ratio between the solid part and the empty part which is greater than that between the solid part and the empty part of the half-drums in the overlapping area of at least one of the first half-drum and the second half-drum, and wherein the holes of the circumferential band have smaller dimensions than the dimensions of the holes of the half-drums.

8. The apparatus according to claim 2, wherein the first vertical walls have a direction of rotation which is substantially parallel to the axis of rotation of the drums and/or along the width of the fibre receiving or forming chamber, and wherein the second vertical walls have a vertical direction of rotation which is substantially perpendicular to the axis of rotation of the drums and/or in the direction of the height of the fibre receiving or forming chamber.

9. The apparatus according to claim 1, wherein the gas-permeable or perforated circumferential band consists of a circumferentially extending gas-permeable or perforated plate fixed on an end portion of the circumferential surface of one of the first half-drum and the second half-drum and partially overlapped to an opposite end portion of the circumferential surface of the other of the first half-drum and the second half-drum.

10. The apparatus according to claim 1, wherein the gas-permeable or perforated circumferential band consists of a gas-permeable or perforated ring integrally formed at one end of one of the first half-drum and the second half-drum and having a greater diameter than the latter, the gas-permeable ring being furthermore partially overlapped to an opposite end portion of the circumferential surface of the other of the first half-drum and the second half-drum.

11. The apparatus according to claim 1, wherein the gas extraction device comprises a suction chamber arranged inside in each drum below the gas-permeable or perforated surfaces thereof, each suction chamber comprising a first half-chamber arranged inside in a first half-drum and a second half-chamber arranged inside in a second half-drum, wherein the first half-chamber and the second half-chamber are movable along the axis of rotation between the first stroke-end position and the second stroke-end position of the first half-drum and the second half-drum, a band being furthermore provided, which overlaps at least one of the first half-chamber and the second half-chamber at opposite end portions of said half-chambers.

12. The apparatus according to claim 1, wherein the first half-drums and the second half-drums are telescopically movable by respective carriages connected to the first half-drums or to the second half-drums and movable back and forth in the direction of the axis of rotation of the drums.

* * * * *